Patented June 8, 1937

2,083,321

UNITED STATES PATENT OFFICE 2,083,321

CALCIUM SULPHATE PLASTER

John Stanley Dunn and Francis Robert Himsworth, Norton-on-Tees, and Victor Lefebure, London, England, assignors to Imperial Chemical Industries Limited, a corporation of Great Britain No Drawing. Application June 18, 1936, Serial No. 86,005. In Great Britain June 24, 1935

4 Claims. (Cl. 106—34)

This invention relates to the manufacture of calcium sulphate plasters, in particular those consisting essentially of calcium sulphate hemihydrate and anhydrite.

For the satisfactory manufacture of building blocks and other moulded articles from calcium sulphate plasters, it is essential that the plaster should set quickly, yet allow sufficient time for mixing and pouring into the mould. Also it should quickly reach a sufficiently high strength to permit handling, and it should have a high final hardness.

Mixtures of calcium sulphate hemihydrate and anhydrite have already been proposed as plasters. The quick-setting properties of the hemihydrate tend to impart to the mix the required early strength for handling, while the anhydrite increases the setting time sufficiently for mixing and pouring to be carried out.

However, for the plaster to have a high final hardness, it is essential that the mixture should contain substances to accelerate the setting of the anhydrite, but their use has hitherto also caused a very quick setting of the hemihydrate. The plasters have consequently set too rapidly for the necessary mixing and pouring into the moulds to be carried out. Further, if attempts are made to delay the setting by means of the usual retarders for plaster of Paris, the hydration of the anhydrite is unfavourably affected, or the action of the anhydrite accelerators is hindered, so that the desired final hardness is not obtained.

We have now found that by the addition of a small amount of a retarder consisting of a soluble citrate, e. g. calcium citrate, or calcium succinate, or calcium malate or calcium propionate, to plaster or plaster mixes containing calcium sulphate hemihydrate and accelerated anhydrite, the setting does not take place too quickly for mixing and pouring to be carried out and the product also has the desired high final hardness. The anhydrite may be ground mineral anhydrite or finely divided anhydrous calcium sulphate of any origin. Suitable accelerators are well known in the art, e. g. potassium sulphate and zinc sulphate.

To render the mix pourable, it is necessary to gauge the plaster with a high percentage of water, and under these conditions, in order to obtain the quick firm set necessary for handling, it is preferable to use not less than one part of the hemihydrate to three parts of anhydrite.

Examples of suitable plasters are the following:—

|   |   | Parts by weight |
|---|---|---|
| (1) | Anhydrite | 75 |
|   | Hemihydrate | 25 |
|   | Potassium sulphate | 0.6 |
|   | Zinc sulphate | 1.1 |
|   | Calcium citrate | 0.2 |

When gauged with 46 parts of water, initial set of the mix as measured by the Vicat needle occurs in 5 minutes, and the block is strong enough to be handled in 1 hour.

|   |   | Parts by weight |
|---|---|---|
| (2) | Anhydrite | 75 |
|   | Hemihydrate | 25 |
|   | Potassium sulphate | 0.6 |
|   | Zinc sulphate | 1.1 |
|   | Calcium malate | 0.1 |

When gauged with 46 parts of water, initial set of the mix occurs in 5 minutes, and the block is firm enough to handle in ½ hour.

The other organic compounds mentioned may be used similarly.

As many apparently widely different embodiments of this invention may be made without departing from the spirit and scope thereof, it is to be understood that we do not limit ourselves to the specific embodiments thereof except as defined in the appended claims.

We claim:—

1. A plaster or plaster mix consisting essentially of calcium sulphate hemihydrate and anhydrite, together with a small proportion of at least one accelerator for the hydration of the anhydrite and a small proportion of a retarder selected from the class consisting of soluble citrates, calcium succinate, calcium malate and calcium propionate.

2. A plaster or plaster mix as claimed in claim 1, in which the proportion of hemihydrate is at least one-third by weight of the anhydrite.

3. A plaster consisting of 75 parts by weight of anhydrite, 25 parts of calcium sulphate hemihydrate, 0.6 parts of potassium sulphate, 1.1 parts of zinc sulphate, and 0.2 parts of calcium citrate.

4. A plaster consisting of 75 parts by weight of anhydrite, 25 parts by weight of calcium sulphate hemihydrate, 0.6 parts of potassium sulphate, 1.1 parts of zinc sulphate, and 0.1 part of calcium malate.

JOHN STANLEY DUNN.
FRANCIS ROBERT HIMSWORTH.
VICTOR LEFEBURE.